(12) United States Patent
Chen et al.

(10) Patent No.: US 11,570,949 B2
(45) Date of Patent: Feb. 7, 2023

(54) LAWN MOWER

(71) Applicant: Globe (Jiangsu) Co., Ltd., Jiangsu (CN)

(72) Inventors: Hui Chen, Jiangsu (CN); Jiafu Xue, Jiangsu (CN); Peng Zhao, Jiangsu (CN); Zhizheng Ding, Jiangsu (CN); Jing Wang, Jiangsu (CN); Zhaochong Liu, Jiangsu (CN); Kai Huang, Jiangsu (CN)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 557 days.

(21) Appl. No.: 16/684,778

(22) Filed: Nov. 15, 2019

(65) Prior Publication Data
US 2020/0154638 A1  May 21, 2020

(30) Foreign Application Priority Data

Nov. 16, 2018  (CN) .......................... 201811367370.3

(51) Int. Cl.
*A01D 34/78* (2006.01)
*A01D 34/00* (2006.01)

(52) U.S. Cl.
CPC ........... *A01D 34/78* (2013.01); *A01D 34/006* (2013.01)

(58) Field of Classification Search
CPC .... A01D 34/78; A01D 34/006; A01D 34/838; A01D 75/20; A01D 2101/00; A01D 34/824; A01D 34/66; A01D 34/64; A01D 67/04; A01D 34/86; B60N 2/38
USPC ........................................................ 56/10.1
See application file for complete search history.

(56) References Cited

U.S. PATENT DOCUMENTS

| | | | | |
|---|---|---|---|---|
| 3,736,729 | A * | 6/1973 | Peterson | A01D 34/64 56/10.5 |
| 3,999,643 | A * | 12/1976 | Jones | A01D 34/6806 192/3.56 |
| 2015/0081153 | A1* | 3/2015 | Wyatt | B60L 58/24 701/22 |
| 2017/0226979 | A1 | 8/2017 | Koenen et al. | |
| 2017/0335818 | A1* | 11/2017 | Dwyer | F02N 11/101 |

FOREIGN PATENT DOCUMENTS

| JP | 2009255840 | * 11/2009 | ........... B62D 11/003 |
|---|---|---|---|
| JP | 2009255840 A | * 11/2009 | .......... B60L 15/2036 |

* cited by examiner

*Primary Examiner* — Ghassem Alie
(74) *Attorney, Agent, or Firm* — Rooney IP, LLC

(57) ABSTRACT

A lawn mower, wherein the cutter system of the lawn mower needs to judge whether the start pulse and the start signal of the cutter switch are valid at the same time under the condition that the seat switch is closed, and the cutter system will be started, only the two conditions are met at the same time, thus not only improving the safety when the cutter system is started, but also the startup of the cutter system can be completed automatically, saving time and labor, and reducing the operator's operation difficulty.

7 Claims, 2 Drawing Sheets

LAWN MOWER

CROSS-REFERENCE TO RELATED APPLICATIONS

This application is a US application which claims the priority of CN Application Serial No. 201811367370.3, filed on Nov. 16, 2018, the disclosures of which are hereby incorporated by reference in their entirety.

TECHNICAL FIELD

The present invention relates to a lawn mower.

BACKGROUND

Lawn mower is a dedicated equipment for mechanically mowing the lawn. Because it is a dedicated equipment, the lawn mower has a sharp blade. The sharp blade is in a high-speed rotation state when working. Therefore, in order to ensure safety, the lawn mower must be able to start normally under restricted safety conditions, otherwise it will cause a danger that is difficult to predict.

At present, the starting condition of the cutter switch of a mower on the market is: the whole machine is turned off if the driver leaves when the cutter is in the starting state, and the whole machine is restarted to continue to work after the driver sits on the seat again, the operation is relatively cumbersome, and frequent startup will also affect efficiency.

In view of this, it is indeed necessary to make further improvements to the current startup of a cutter switch to solve the above problems.

SUMMARY OF INVENTION

It is an object of the present invention to provide a lawn mower that saves time and effort when starting the cutter system of the lawn mower, and can reduce the operator's operational difficulty.

To achieve the above object, the present invention provides a lawn mower comprising: a battery, which is configured to provide power to said lawn mower; a walking system, comprising a walking wheel and a self-propelled motor for driving the walking wheel to self-propelled; a cutter system, comprising a blade, a drive motor for driving the blade to rotate, a start switch for activating said cutter system, a seat switch, and a cutter switch; said cutter system starts to work when the seat switch is switched on and both the start pulse and the start signal of the cutter switch are valid.

In some embodiments, when said seat switch is switched on, said start switch is switched on, and said cutter system is powered on; when said seat switch is switched off, said start switch is switched off, and said cutter system is powered off.

In some embodiments, said start switch is a contactor.

In some embodiments, said cutter system further comprises a high-low speed cutter switch for controlling the rotational speed of said blade, when the cutter system starts to work, if the high-low speed cutter switch is active, the blade rotates at a high speed; if the high-low speed cutter switch is inactive, the blade rotates at a low speed.

In some embodiments, the start pulse of said cutter switch comprises a rising edge and a falling edge, and the start signal of the cutter switch comprises a low-level input and a high-level input.

In some embodiments, if the start signal of the cutter switch is valid when using a low-level input, and the start pulse of the cutter switch is valid when it is a falling edge, the cutter system is activated.

In some embodiments, if the start signal of the cutter switch is valid when using a high-level input, and the start pulse of the cutter switch is valid when it is a rising edge, the cutter system is activated.

In some embodiments, when the start pulse of the cutter switch is a rising edge, the pulse clock signal CLK transitions from 0 to 1; when the start pulse of the cutter switch is a falling edge, the pulse clock signal CLK transitions from 1 to 0.

In some embodiments, when the start signal of the cutter switch is a high-level input, the pulse clock signal CLK is 1; when the start signal of the cutter switch is a low-level input, the pulse clock signal CLK is 0.

The beneficial effects of the present invention are: the lawn mower in the invention needs to judge whether the start pulse and the start signal of the cutter switch are valid at the same time under the condition that the seat switch is switched on, and only the two conditions are satisfied at the same time, the cutter system will start, thus not only increasing the safety factor when the cutter system is started, but also the startup of the cutter system can be completed automatically, saving time and labor, and reducing the operator's operation difficulty.

DESCRIPTION OF EMBODIMENTS

In order to make the objects, technical solutions and advantages of the present invention more clear, the present invention will be described in detail below with reference to the drawings and specific embodiments.

Figure 3:
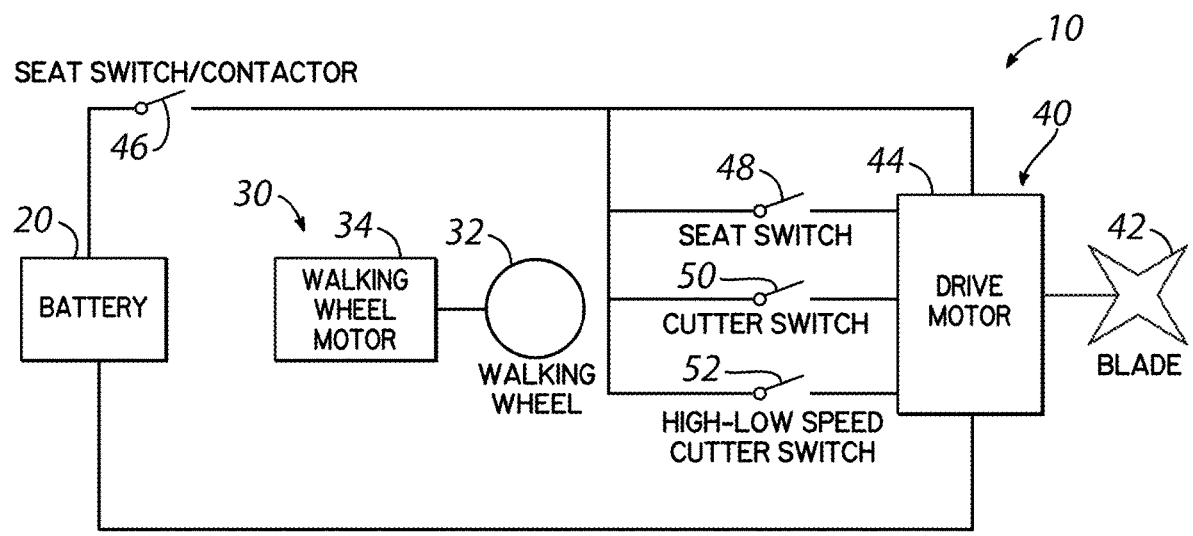
FIG. 3 is a schematic diagram of the lawn mower of FIG. 1.

Please refer to FIG. 3, the invention provides a lawn mower 10 mainly comprising a battery 20, a walking system 30 and a cutter system 40. The battery 20 is configured to provide power to the lawn mower 10; said walking system 30 comprises a walking wheel 32 and a self-propelled motor 34 mainly used for driving the walking wheel 32, and is used for driving the lawn mower 10 to perform self-propelling; said cutter system 40 comprises a blade 42, a drive motor 44 for driving said blade 42 to rotate, a start switch 46 for activating the cutter system 40, a seat switch 48, a cutter switch 50, and a high-low speed cutter switch 52 for controlling the rotational speed of said blade 42. Of course, said lawn mower 10 further comprises other structures, such as a control system, a control lever, a casing, etc., and these structures will not be described in detail herein, since they are prior arts.

When the cutter system 40 is activated, said cutter system 40 starts to work if the seat switch 48 is switched on and both the start pulse and the start signal of the cutter switch 50 are valid. When the cutter system 40 starts to work, the blade 42 enters into a high speed mode and rotates at a high speed if the high-low speed cutter switch 52 is active; the blade 42 enters into a low speed mode and rotates at a low speed if the high-low speed cutter switch 52 is inactive.

Of course, said start switch 46 is switched on, and said cutter system 40 is powered on if said seat switch 48 is switched on; and said start switch 46 is turned off, said cutter system 40 is powered off if said seat switch 48 is turned off when said cutter system 40 is activated. In this embodiment, said lawn mower 10 is preferably a driving type lawn mower, said start switch 46 is a contactor 46, and the control system controls the contactor 46 to be closed, and the cutter system 40 is powered on when the seat switch 48 is switched on; the control system controls the contactor 46 to open and the cutter system 40 is powered off when the seat switch 48 is turned off.

Said seat switch 48 generally implements a function in which the seat switch 48 is in an on state when the operator is present, and the seat switch 48 is in an off state when the operator is absent. For example, the seat switch 48 can be placed under the seat, and the seat switch 48 can be pressed by operator's gravity when the operator sits on the seat; the seat switch 48 is turned off, and then the start switch 46 is turned off and the cutter system 40 is stopped when the operator leaves the seat halfway; the seat switch 48 is switched on, and then the start switch 46 is closed and the cutter system 40 is started when the operator sits back on the seat. Of course, it is also possible to place the seat switch 48 on other parts than the seat, such as the left or right side of the operator, or the front joystick. In addition, the seat switch 48 may be a switch having infrared induction as long as it can realize a function of switching on when the operator is present and switching off when the operator leaves.

In addition, when said cutter system 40 is started, if one of the start pulse and the start signal of the cutter switch 50 is invalid, the cutter system 40 is stopped until the seat switch 48 is switched on and the start pulse and the start signal of the cutter switch 50 are simultaneously valid, then the cutter system 40 will restart.

If one of the battery 20, the walking system 30, and the cutter system 40 breaks down, the cutter system 40 stops and the blade 42 does not rotate. Only after the fault is removed, the state of the seat switch 48, the start pulse and the start signal of the cutter switch 50 can be rejudged. Repeat in this way, the cutter system 40 will not start until the start condition is met.

In the following, the contactor 46 is taken as an example to describe the starting method of the cutter system 40 in detail, but it should not be limited thereto.

Figure 1:
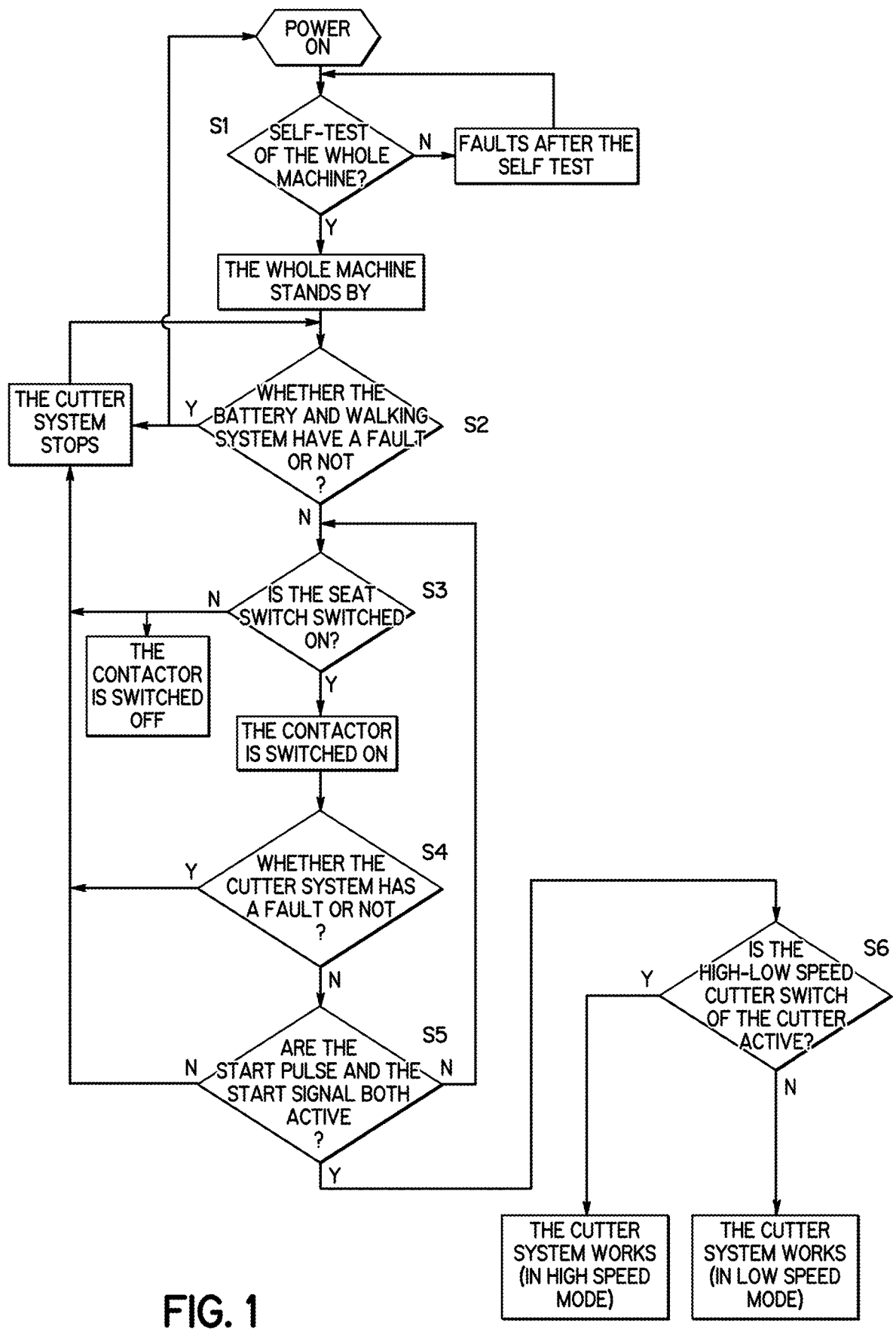
FIG. 1 is a flow chart showing a start method of a cutter system of a lawn mower in the present invention.

Please refer to FIG. 1, the starting method of the cutter system 40 mainly includes the following steps:

S1. After power-on, the lawn mower 10 performs self-test of the whole machine, and the whole machine stands by after the self-test passes;

S2. Judging whether there is a fault in the battery 20 and the walking system 30 in the standby state of the whole machine, if yes, the cutter system 40 stops and proceeds to step S1 after the fault is removed, and if not, continue to the next;

S3. Determine whether the seat switch 48 is switched on, if not, the cutter system 40 stops, and the contactor 46 is switched off, and if yes, the contactor 46 is switched on;

S4. Judging whether there is a fault in the cutter system 40, if yes, the cutter system 40 stops and proceeds to step S2 after the fault is removed, and if not, continue to the next;

S5. Determining whether the start pulse and the start signal of the cutter switch 50 are valid at the same time. If not, the cutter system 40 stops and loops to step S3, and if yes, continue to the next;

S6. Determine whether the high-low speed cutter switch 52 of the cutter system 40 is active. If yes, the cutter system 40 activates and operates in a high speed mode. If not, the cutter system 40 activates and operates in a low speed mode.

Specifically, in step S1, when the lawn mower 10 performs the self-test of the whole machine, if there is a fault, the power will be turned off and the process proceeds to step S1 until the self-test passes.

In step S5, the start pulse of said cutter switch 50 comprises a rising edge and a falling edge, and the start signal of the cutter switch 50 includes a low-level input and a high-level input.

After step S6, if the seat switch 48 is turned off, the contactor 46 is switched off, and the cutter system 40 is automatically stopped. It will be rejudged that whether the start pulse and the start signal of the cutter switch 50 are both valid, and whether the cutter system 40 can be activated until the seat switch 48 is turned on and the contactor 46 is switched on. That is to say, even if the cutter system 40 is in the startup state, the control system will monitor the state of the seat switch 48 in real time to achieve the effect of stopping the cutter system 40 when the operator leaves, and it is unnecessary to start the whole machine when the cutter system 40 is restarted.

Figure 2:
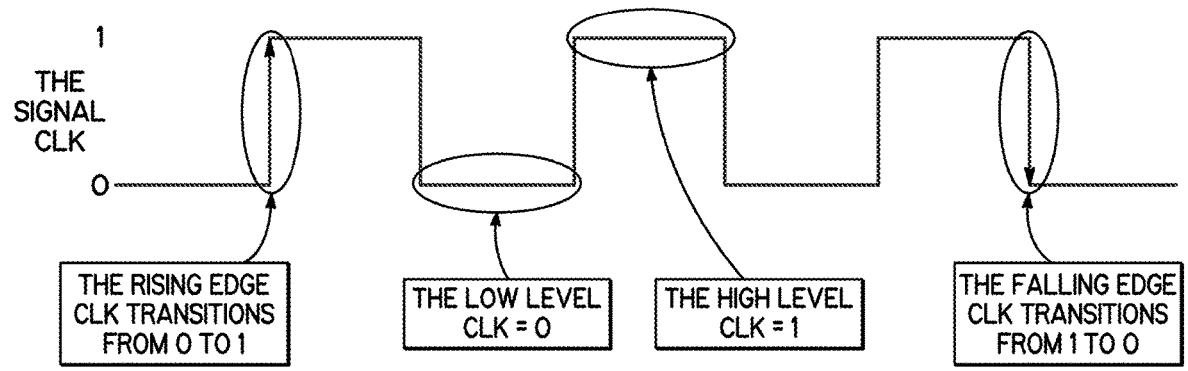
FIG. 2 is a schematic diagram of the start signal and start pulse of the cutter switch.

Please refer to FIG. 2, the on/off action of the cutter switch 50 can be captured through the value changes of the pulse clock signal CLK when the start pulse of the cutter switch 50 is a rising edge or a falling edge, and the valid start signal of the cutter switch 50 is a low level or a high level in the normal case.

In general, when the start pulse of the cutter switch 50 is a rising edge, the pulse clock signal CLK transitions from 0 to 1; when the start pulse of the cutter switch 50 is a falling edge, the pulse clock signal CLK transitions from 1 to 0; when the start signal of the cutter switch 50 is a high level, the pulse clock signal CLK is 1; when the start signal of the cutter switch 50 is a low level, the pulse clock signal CLK is 0.

There are many ways to determine whether the cutter switch 50 is switched on or off by the change of the value of the pulse clock signal CLK. The following part of the specification will illustrate three of them by examples, but it should not be limited thereto.

Method 1: define the start signal of the cutter switch 50 to be active low (1), then determine the starting condition of the cutter system 40 through a falling edge and the low level state of the cutter switch 50.

Method 1: define the start signal of the cutter switch to be active low (1), then determine the starting condition of the cutter system through a falling edge and the low level state of the cutter switch.

| State | the falling edge of the cutter switch | the low level of the cutter switch |
|---|---|---|
| the cutter system stops | 0 | 0 |
| the cutter system stops | 1 | 0 |
| the cutter system stops | 0 | 1 |
| the cutter system works | 1 | 1 |

It can be seen from the above table that when the cutter switch 50 is invalid low level (0), the cutter system 40 is in the stop state regardless of whether the falling edge of the cutter switch 50 is active (1) or inactive (0); when the cutter switch 50 is active low (1), if the falling edge of the cutter switch 50 is inactive (0), the cutter system 40 is still in the stop state; when the cutter switch 50 is active low (1), if the falling edge of the cutter switch 50 is active (1), the cutter system 40 will be activated.

We can conclude from the above table that: if the start signal of the cutter switch 50 is active low (1), and the valid start pulse of the cutter switch 50 is a falling edge (1), the cutter system 40 is activated.

Method 2: define the start signal of the cutter switch 50 to be active high (1), then determine the starting condition of the cutter system 40 through a rising edge and the high level state of the cutter switch 50.

Method 2: define the start signal of the cutter switch to be active high (1), then determine the starting condition of the cutter system through a rising edge and the high level state of the cutter switch.

| State | the rising edge of the cutter switch | the high level of the cutter switch |
|---|---|---|
| the cutter system stops | 0 | 0 |
| the cutter system stops | 1 | 0 |
| the cutter system stops | 0 | 1 |
| the cutter system works | 1 | 1 |

It can be seen from the above table that when the cutter switch 50 is invalid high level (0), the cutter system 40 is in the stop state regardless of whether the rising edge of the cutter switch 50 is active (1) or inactive (0); when the cutter switch 50 is active high level (1), if the rising edge of the cutter switch 50 is invalid (0), the cutter system 40 is still in the stop state; when the cutter switch 50 is active high level (1), if the rising edge of the cutter switch 50 is valid (1), the cutter system 40 will be activated.

We can conclude from the above table that: if the start signal of the cutter switch 50 is active high (1), and the valid start pulse of the cutter switch 50 is a rising edge (1), the cutter system 40 is activated.

Method 3: redundancy control is performed with two or more cutter switches (not shown). One cutter switch is active high (1), and the other cutter switch is active low (1). It is also adoptable to use the rising or falling edge and the high and low state detection of the cutter switch 50 to determine the starting condition of the cutter system 40.

Method 3: redundancy control is performed with two or more cutter switches. One cutter switch is active high (1), and the other cutter switch is active low (1). It is also adoptable to use the rising or falling edge and the high and low state detection of the cutter switch to determine the starting condition of the cutter system.

| State | the rising edge of the cutter switch | the high level of the cutter switch | the falling edge of the cutter switch | the low level of the cutter switch |
|---|---|---|---|---|
| the cutter system stops | 0 | 0 | 0 | 0 |
| the cutter system stops | 1 | 0 | 1 | 0 |
| the cutter system stops | 0 | 1 | 0 | 1 |
| the cutter system works | 1 | 1 | 1 | 1 |

It can be seen from the above table that the third method is the combination of the foregoing method 1 and method 2. Therefore, it can be concluded that when the cutter switch 50 is active high (1), the corresponding valid start pulse is a rising edge (1), as well as, the cutter switch 50 is active low (1), the corresponding valid start pulse is a falling edge (1), the cutter system 40 will start; otherwise, the cutter system 40 remains in stopped status.

It can be seen that the lawn mower 10 of the present invention can capture the switch-on and switch-off actions of the cutter switch 50 by the rising and falling edges which are used to detect the switch-on and switch-off actions of the cutter switch 50, thereby only when the "seat switch 48 is switched on", the start pulse and the start signal of the cutter switch 50 can be judged, and the cutter system 40 can only be started when the start pulse and the start signal of the cutter switch 50 are simultaneously valid. In other words, the cutter system 40 can only be started properly when the order in which the switch is closed is met.

In summary, the beneficial effects of the present invention are: the lawn mower 10 in the invention needs to judge whether the start pulse and the start signal of the cutter switch 50 are valid at the same time under the condition that the seat switch 48 is switched on, and only the two conditions are satisfied at the same time, the cutter system 40 will start. After the cutter system 40 stops halfway, it is not necessary to restart the whole machine. Directly judge the state of the seat switch 48, and sequentially enter the next action. In this way, not only increasing the safety factor when the cutter system 40 is started, but also the startup of the cutter system 40 can be completed automatically, saving time and labor, and reducing the operator's operation difficulty.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

We claim:

1. A lawn mower, comprising:
   a battery configured to provide power to said lawn mower;
   a walking system, comprising a walking wheel and a motor for driving the walking wheel;
   a cutter system, comprising:
     at least one blade,
     at least one drive motor for driving said blade to rotate,
     a contactor for activating said cutter system,
     a seat switch, and
     a cutter switch; and
   a control system configured to open and close the contactor;
   wherein said cutter system starts to work when the seat switch is switched on the contactor is closed and the cutter switch is switched on,
   the control system opens said contactor and said cutter system is powered off when said seat switch is switched off, and
   the control system closes said contactor and said cutter system is powered back on when said seat switch is switched back on.

2. The lawn mower according to claim 1, wherein said cutter system further comprises a high-low speed cutter switch for controlling a rotational speed of said blade, when the cutter system starts to work, the at least one blade rotates at a high speed if the high-low speed cutter switch is active and the at least one blade rotates at a low speed if the high-low speed cutter switch is inactive.

3. The lawn mower according to claim 1, wherein a start pulse of said cutter switch comprises a rising edge and a falling edge, and a start signal of the cutter switch comprises a low-level input and a high-level input.

4. The lawn mower according to claim 3, wherein the cutter system is activated if the valid start pulse of the cutter switch is a falling edge when the valid start signal of the cutter switch is a low-level input.

5. The lawn mower according to claim 3, wherein if the start signal of the cutter switch is valid when using a high-level input, and the start pulse of the cutter switch is valid when it is a rising edge, the cutter system is activated.

6. The lawn mower according to claim 3, wherein a pulse clock signal CLK transitions from 0 to 1 when the start pulse of the cutter switch is a rising edge; the pulse clock signal CLK transitions from 1 to 0 when the start pulse of the cutter switch is a falling edge.

7. The lawn mower according to claim 6, wherein the pulse clock signal CLK is 1 when the start signal of the cutter switch is a high-level input; the pulse clock signal CLK is 0 when the start signal of the cutter switch is a low-level input.

* * * * *